United States Patent
Toutoux et al.

(10) Patent No.: US 7,862,328 B2
(45) Date of Patent: Jan. 4, 2011

(54) BLOW MOLDING STATION FOR A CONTAINER STRETCH BLOW MOLDING PLANT AND PLANT COMPRISING ONE SUCH ASSEMBLY

(75) Inventors: Alexandre Toutoux, Octeville-sur-Mer (FR); Denis Gillet, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 437 days.

(21) Appl. No.: 12/063,536

(22) PCT Filed: Aug. 16, 2006

(86) PCT No.: PCT/FR2006/001952

§ 371 (c)(1),
(2), (4) Date: Feb. 11, 2008

(87) PCT Pub. No.: WO2007/020355

PCT Pub. Date: Feb. 22, 2007

(65) Prior Publication Data

US 2010/0159056 A1  Jun. 24, 2010

(30) Foreign Application Priority Data

Aug. 12, 2005 (FR) ................... 05 08547

(51) Int. Cl.
*B29C 49/12* (2006.01)
*B29C 49/36* (2006.01)

(52) U.S. Cl. ................. 425/529; 425/535; 425/540

(58) Field of Classification Search ........... 425/522, 425/529, 535, 540, 541, DIG. 5
See application file for complete search history.

(56) References Cited

U.S. PATENT DOCUMENTS

| 3,977,822 | A | 8/1976 | Reilly et al. |
| 4,141,680 | A | 2/1979 | Kauffman et al. |
| 6,722,868 | B1 * | 4/2004 | Evrard ............... 425/529 |
| 6,729,868 | B1 | 5/2004 | Vogel et al. |
| 2003/0118686 | A1 * | 6/2003 | Voth et al. .......... 425/529 |
| 2004/0009257 | A1 * | 1/2004 | Galloni ............... 425/529 |

FOREIGN PATENT DOCUMENTS

| DE | 38 15 193 A1 | 11/1989 |
| FR | 2 814 392 A1 | 3/2002 |
| FR | 2 863 928 A1 | 6/2005 |
| FR | 2 863 929 A | 6/2005 |
| GB | 1 493 806 A | 11/1977 |

* cited by examiner

*Primary Examiner*—Robert B Davis
(74) *Attorney, Agent, or Firm*—Sughrue Mion, PLLC (57) ABSTRACT

The invention relates to a station for the stretching/blowing of preforms having an upward-facing open end. The inventive station comprises a bracket that supports a blow mould, a stretch rod and means for controlling the movements of the stretch rod. The aforementioned control means comprise: (i) an actuator, and (ii) a roller and a speed control cam, said roller coming into contact with the speed control cam as the stretch rod enters the blow mould, thereby controlling the speed with which the stretch rod enters the blow mould. The invention is characterised in that the speed control cam is disposed below the base of the blow mould.

14 Claims, 7 Drawing Sheets

BLOW MOLDING STATION FOR A CONTAINER STRETCH BLOW MOLDING PLANT AND PLANT COMPRISING ONE SUCH ASSEMBLY

TECHNICAL FIELD

The present invention relates in general terms to the manufacture of containers made of a thermoplastic, such as PET or PEN by a stretch-blow molding process, from a parison.

The invention relates particularly to stretch-blow molding machines of the rotary type, that is, comprising several blow molding stations mounted around the perimeter of a carousel which is rotated continuously about its axis. Each blow molding station comprises among other things a blowing mold, a blowing device and a stretch device.

The following definitions are given for reasons of clarity only.

These definitions refer to the terminology commonly used in the trades on which the present invention has some bearing.

"PET" means poly(ethylene terephthalate), that is to say a polyester produced for example by polycondensation from terephthalic acid and ethylene glycol.

"PEN" means poly(ethylene naphthalate). This is also a polyester.

"Parison" means a preform or intermediate container.

A preform is generally a roughly tubular object closed at one axial end, its opening being in the final shape of the neck of the final hollow body, such as a bottle.

"Blow molding" means a process in which the parison is placed in a finishing mold containing the impression of the container to be obtained, a blowing nozzle being connected to the opening (the neck) of this parison, and a high-pressure blowing fluid being used to push the parison material against the mold walls. The finishing mold may be a hinged mold. The blowing fluid is usually air.

"Stretch-blow molding" means a process in which a stretch rod (also known as a stick) stretches the preform down into the blowing mold by pushing against the bottom wall of the preform. Such a process is used in so-called simple blow molding machines. Such a process is used particularly for blowing previously injection-molded preforms, where stretching (or elongation) is performed before or during the blowing of the preform. Where the stretching occurs before the blowing, preblowing is performed to ensure in particular that the material does not stick to the stretch rod. Before stretch-blow molding, the thermoplastic preforms are heated in a conditioning oven to raise them to a temperature above the glass transition temperature of the thermoplastic material.

"Stretch-blow molding" is also used here to refer to a process in which a stretch rod is used to stretch an intermediate container. Such a process is used in so-called double blow molding machines.

BACKGROUND OF THE INVENTION

As set out for example in document FR 2 764 544 by the Applicant, the stretch rod is conventionally introduced into the opening (the neck) of the parison which is to be stretched and blown. This stretch rod slides through a member known as a nozzle. The rod slides axially along the longitudinal axis of the nozzle and an annular space is left unoccupied around this rod for the blowing fluid to pass through.

Stretching a PET parison and preblowing it at medium pressure (e.g. 7 bar) lead to an axial elongation speed of around 0.8 to 1.2 m/s. The radial stretching produced by high-pressure blowing (e.g. 40 bar) presses the material against the mold walls which are cooled, for example by an internal chilled water circuit.

It is very important for the quality of the blow-molded product to control the speed of axial elongation. It is also important to synchronize the movement of the stretch rod with the start of blowing. The kinematics of the stretch rods must therefore be controlled, but control is difficult, especially in modern stretch-blow molding machines which run at very high speeds.

The stretch speed is conventionally controlled by a roller and cam device mounted at the top of the machine. This device is so conventional that it is often not even depicted (see for example the Applicant's document FR 2 863 929).

This roller and cam device is designed to synchronize the axial position of the stretch rod with the angular position of the blow molding station around the axis of rotation of the carousel.

Figure 1:
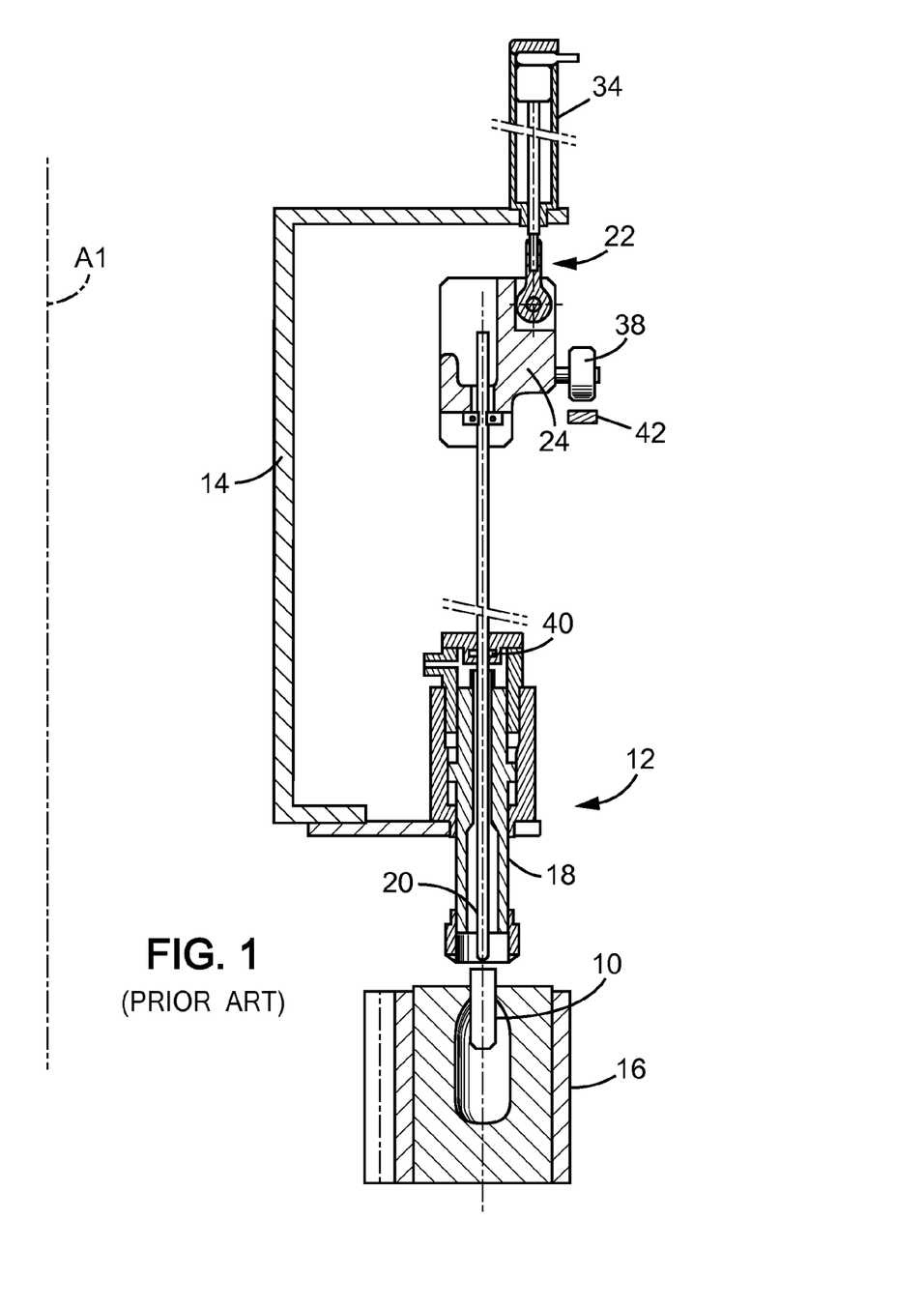
FIG. 1 is a view taken from the Applicant's document FR 2 814 392.

The appended FIG. 1, which is taken from the Applicant's document FR 2 814 392, illustrates a conventional configuration of this roller and cam control.

The prior-art machine illustrated in FIG. 1 is rotary: it comprises several stretch-blow molding stations 12 mounted on a carousel 14. The carousel 14 is rotated continuously about its axis A1. Each stretch-blow molding station 12 comprises a blowing mold 16, a blowing nozzle 18, a stretch rod 20, and control means 22 for controlling the movements of the stretch rod 20. The rods 20 are attached at their top end to a slider 24 which can slide vertically on a rail (not shown) mounted on the carousel 14. The blow molding station comprises a pneumatic thrust cylinder controlled on a fully-on or fully-off basis and acting on the slider 24 to push it axially down. The stretching speed is controlled by a control cam that forms a helix about the axis A1 of the carousel 14. The slider 24 comprises a roller 38 which, under the action of the thrust cylinder 34, pushes against said cam. When the rod 20 rises, the control chamber of the thrust cylinder 34 is vented to atmosphere. At this point, because of the presence of the seal 40, only the lower end of the rod 20 is exposed to the blow molding pressure. The rod 20 is therefore now subjected to an upward axial force equal to the blow molding pressure multiplied by the transverse area of the rod in section. Depending on the individual case, this force may be of around 50 to 150 daN, which is enough to compensate for the weight of the rod 20 and of its control mechanism, and thus move the rod 20 back to its retracted position. It is preferable to provide a safety cam 42 similar to the control cam but designed to force the rod 20 back to its retracted position if the roller 38 touches it. The safety cam 42 ensures that the rod 20 is disengaged from the mold 16 when it is wished to eject the container at the end of the molding operation even if, owing for example to the preform 10 bursting during molding, the pressurized air escapes from the mold.

Document FR 2 863 928, also in the Applicant's name, sets out another form of stretch rod movement control, using a roller and control cam mechanism. Two fixed circular and superposed control cams each define on their inner face a rolling surface for two pusher rollers. These rolling surfaces are provided with humps. The pusher is made to rotate as the rollers roll over these humps. A compass mechanism converts the rotational movement of the pusher into a vertical linear reciprocating movement of the stretch rod.

The stretch rod movement control means described in document FR 2 814 392 or FR 2 863 928 are perfectly satisfactory in terms of the operation of the stretch-blow molding process.

However, the need to significantly reduce the height of stretch-blow molding machines has become clear. The arrangements described in documents FR 2 814 392 and FR 2 863 928 for the control cam and the control thrust cylinders make the machine very tall.

Furthermore, the presence of control cams near the mouths of the bottles as they come out of the molds can lead to accidental contamination because the cams are necessarily lubricated.

It is one of the objects of the invention to solve these problems.

SUMMARY OF THE INVENTION

To these ends, the invention relates, in a first aspect, to a station for the stretch-blow molding of preforms with their open end uppermost, comprising a console supporting a blowing mold; the station also comprising a stretch rod and control means for controlling the movements of the stretch rod, these control means comprising on the one hand an actuator, and on the other hand a roller and a speed control cam, said roller pressing against said speed control cam as the stretch rod enters the blowing mold, thus controlling the speed of entry of this stretch rod into the blowing mold, the speed control cam being located underneath the base of the blowing mold.

The mold may for example be a hinged mold.

The blow molding station comprises a blowing nozzle.

In accordance with various embodiments, the stretch-blow molding station according to the invention has the following features, optionally in combination:

the actuator is a pneumatic or hydraulic thrust cylinder;
the station comprises means for the removable assembly of the stretch rod to the control means for controlling the movements of this stretch rod.

In order to make it possible quickly to change the standardized stretch rod, the removable assembly means comprise a removable casing in which one end of the stretch rod is fixed, the other end of the stretch rod being intended to be inserted into a parison present inside the mold.

The roller is advantageously mounted at the very bottom of an approximately vertically sliding pole, this pole being connected, at its opposite or top end, to an approximately transverse bar mechanically connecting the stretch rod to the rod of the thrust cylinder.

In an advantageous embodiment, the casing is fixed to the transverse bar.

In order to coordinate the downward movement of the stretch rod with that of the thrust cylinder rod, the upper end of the rod of the thrust cylinder is fixed to the transverse bar.

In order to reduce the total height of the stretch-blow molding station, the roller presses against the top edge of the cam as the stretch rod descends into the parison present inside the mold.

In order to reduce the total volume of the stretch-blow molding station, the thin pole, the stretch rod and the rod of the thrust cylinder are mutually parallel.

In order to coordinate the downward movement of the stretch rod into the parison present inside the mold with the rolling of the roller along the cam controlling this descent, the actuator is controlled in such a way that the thin pole exerts a vertical downward force on the cam when the roller is rolling along the cam.

In order that the rod returns to its initial position before the stretch blow molding operation, the actuator is able to raise the stretch rod once the rod has finished stretching the parison present inside the mold and/or once the roller is no longer pressing on the cam which controls the speed of descent of the rod.

In a second aspect, the invention relates to a carousel-type stretch-blow molding machine comprising:

a revolving frame rotating about an axis of rotation;
several stretch-blow molding stations supported by the revolving frame;
a revolving fluid-supply column coaxial with the axis of rotation of the revolving frame; and
at least one revolving fluid connector located on said column and connected to fixed sources of fluids, this machine comprising at least one stretch-blow molding station as set out above.

BRIEF DESCRIPTION OF THE DRAWINGS

The invention will be understood more clearly from a reading of the following detailed description of certain preferred embodiments presented purely by way of illustration, no limitation being implied.

This description will refer to the appended drawings, in which.

DESCRIPTION OF THE PREFERRED EMBODIMENT OF THE INVENTION

Figure 2:
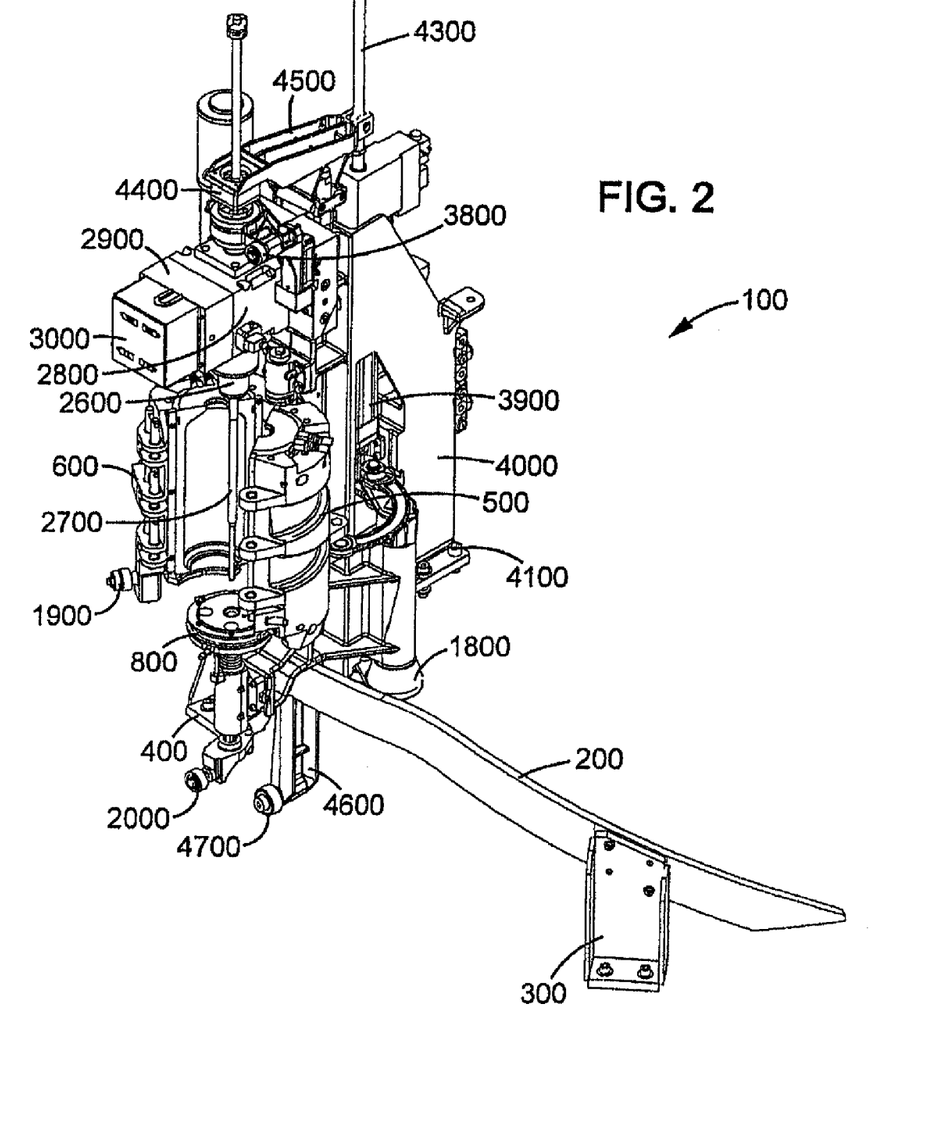
FIG. 2 is a perspective view of a stretch-blow molding station in one embodiment of the invention, certain component parts of the station being shown in an actuated extended position not fixed to the rest of the stretch-blow molding station for the sake of clarity and legibility of the figure.
Figure 3:
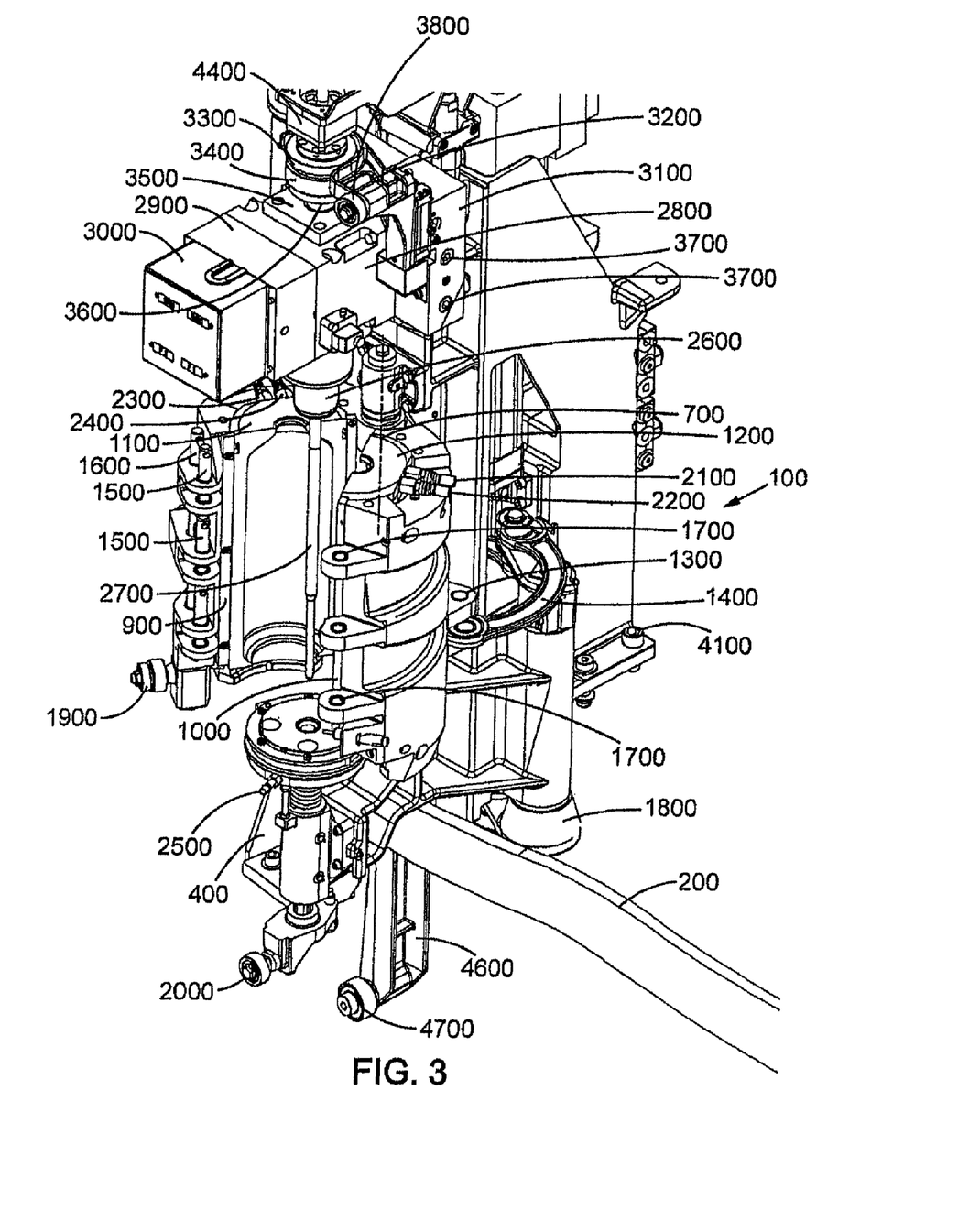
FIGS. 3 and 4 are views of the stretch-blow molding station shown in FIG. 2, seen from other angles.

The reader should refer initially to FIGS. 2 and 3.

These FIGS. 2 and 3 show a stretch-blow molding station 100 of a rotary stretch-blow molding machine.

The term "rotary stretch-blow molding machine" is used here to denote carousel type machines comprising:

a revolving frame rotating about an axis of rotation;
several stretch-blow molding stations supported by the revolving frame;
a revolving fluid supply column coaxial with the axis of rotation of the revolving frame; and
at least one revolving fluid connector mounted on said column and connected to fixed sources of fluids.

Revolving stretch-blow molding machines may have several tens of stretch-blow molding stations distributed around a central fluid supply column.

This invention also relates to such a stretch-blow molding machine of the carousel type comprising a stretch-blow molding station according to the invention and as illustrated in FIGS. 2-7.

The preforms are blown with their open end toward the top of FIG. 2, so that the blowing nozzle and the stretch rod are above the mouth of the mold. It is from this arrangement that the notions of verticality, top, bottom, upper and lower which will be used in this text are derived.

The rotating machine is provided with cams 200 to control the movement of the stretch rod 2700. One of these cams 200 is shown in FIG. 2, this cam 200 being fixed at both ends to the fixed frame of the rotating machine, the frame not being shown in order to simplify the drawing.

The cam 200 is mounted on the fixed frame by a lower bracket 300 and an upper bracket 400, these brackets 300, 400 being screwed to the cam 200 and to the fixed frame of the machine. To this end, each bracket 300, 400 is in the form of an I section, one of its flanges being against the cam 200 and a lower transverse wall being against the fixed frame of the machine.

Each station 100 supports a hinged mold. "Hinged mold" refers for example to the molding devices described in patents FR 2 646 802, FR 2 653 058, FR 2 737 436 and FR 2 843 714, all in the name of the Applicant.

In the embodiment illustrated, the mold comprises two shell holders 500, 600 hinged about an axis 700, and a base 800, this base 800 being movable along an axis essentially parallel to the axis 700.

The two shell holders 500, 600 have mating faces or bearing faces defined by meeting bars 900, 1000. These meeting bars 900, 1000 define a parting line for the mold.

An internal molding part or shell 1100, 1200 is fitted to each shell holder 500, 600. The fitting is advantageously detachable so that the shell holders 500, 600 forming the outer structure of the mold can be fitted with different shells 1100, 1200 machined to suit the shape of the container to be produced.

During stretch-blow molding, the material of the parison presses against the inside wall of the shells 1100, 1200.

On each shell holder 500, 600, a projecting external lug 1300 gives rotary support to one end of an actuating link 1400. The other two ends of the two actuating links 1400 come together and rotate freely on a shaft that can be moved linearly toward the mold opening/closing axis 700.

The mold is provided with locking means. The locking means comprise, on one shell holder, pins 1500 and a locking shaft 1600. The locking means include rings 1700 on the other shell holder 500.

The locking means prevent the mold from opening or gaping when very high pressure blowing fluid is introduced.

On the rotating machine, mold opening/closure is effected by the rotation of follower rollers 1800 acted upon by a first set of cams (not shown).

Similarly on the rotating machine, mold locking/unlocking is effected by the rotation of follower rollers 1900 acted upon by a second set of cams (not shown).

In the embodiment shown in FIG. 2, the mold base 800 is movable axially, essentially parallel to the mold opening/closing axis 700. This axial movement of the mold bases 800 is caused by the rotation of follower rollers 2000 acted upon by a third set of cams (not shown).

It should be noted that the stretch cams 200 are positioned at about the same height as many other cams: those of the mold opening/closing rollers 1800; those of the mold locking/unlocking rollers 1900; and those of the mold base axial movement rollers 2000.

Within the thickness of the shells 500, 600 there are cooling circuits consisting of channels and/or cavities through which a coolant such as water flows. Fluid connection ends 2100-2500 for each shell 1100, 1200 and for the mold base 800 can be seen in FIG. 2. These ends 2100-2500 are connected to the rotating central fluid supply column via hoses (not shown in the figures for reasons of clarity only).

A blowing nozzle 2600 and a stretch rod 2700 are mounted as in the prior art axially on the stretch-blow molding station 100 and run through a body 2800 containing internal passage ways for preblowing, blowing and degassing fluid.

This body 2800 is of rectangular cross section and its overall shape is roughly cubical.

At the front of this body 2800, a block 2900 contains four housings for electrically operated valves. This block 2900 is mounted detachably on the body 2800 by means of screws or the like.

In front of this block 2900, a casing 3000 houses the controls of the electrically operated valves.

A plate or block 3100 containing internal air channels is mounted on the rear face of the body 2800. This plate or block 3100 is mounted removably on the body 2800, by means of screws or the like. A silencer of the type known per se and not shown in the figures is mounted on the plate or block 3100.

The heads of the screws mounting the casing 3000 on the block 2900 are, like the heads of the screws mounting the block 2900 on the body 2800, all directed toward the front of the station 100. This arrangement facilitates maintenance assembly and disassembly.

The blowing nozzle 2600 forms the lower part of an assembly that behaves like a piston. This piston belongs to a ram whose body 2800 acts as the cylinder.

Control means move the blowing nozzle 2600 down until there is leak-tight contact between this nozzle 2600 and the top of the mold. The control means comprise a fork 3200 that engages with an annular groove 3300 on the outside of a tubular part 3400 connected to the upper part of the blowing nozzle 2600.

A transverse cover 3500 is mounted on the body 2800. In the end-of-travel position, an annular damping seal 3600 is pressed against this cover 3500.

The fluid power connections (not shown in the figures) are provided on the rear face of the block 3100.

The perforated interface block 3100 receives at 3700 the fluid power connections, advantageously by quick connection.

For disassembly during maintenance work, there is no need to disconnect the fluids because the interface block 3100 stays on the machine.

During re-assembly, locating pins (not shown) ensure correct positioning of the body 2800 on the interface block 3100: no re-adjustment is required.

The fork 3200 is part of a guided unit connected to the rear plate 3100. This guided unit is operated by a cam (not shown in the figures but of the type known per se) on a roller 3800. The movement is transmitted from the moving unit to the nozzle 2600 by the fork 3200.

The nozzle 2600 is in the down position at rest. The counterforce applied to keep the control roller 3800 on the cam may be provided in two different ways:
   a mechanical spring;
   a pneumatic spring integrated in the form of a piston connected to and concentric with the nozzle, moving translationally in a chamber, the upper part of which is under pressure. By adjusting the pressure, the value of the force can be adjusted. The lower chamber can thus be used as a means of raising the nozzle.

In another embodiment, the control of the translational movement of the nozzle is provided pneumatically. The nozzle is connected to a concentric piston moving translationally in a chamber whose upper and lower parts are connected to a pneumatic directional control valve.

The positioning of the nozzle 2600 will now be described.

The down position of the nozzle 2600 is realized by the damped contact of the seal 3600 on the cover 3500. This configuration offers at least two advantages:

adjusting the down position of the nozzle 2600 does not affect the position of the assembly made up of the groove 3300/fork 3200/guided unit/roller 3800; the relative position of the cam with respect to the roller 3800 has not been modified in the event of modification of the down position of the nozzle 2600; and the fitting attached to the nozzle 2600, and comprising the seal for blowing the hollow bodies, does not have to be adjustable on the nozzle 2600; replacing this seal is a quicker, simpler operation.

The fitting of the stretch rod and the control of its movement will now be described more specifically.

An actuator, advantageously a thrust cylinder 3900, preferably pneumatic or hydraulic, is mounted on the console 4000 of the station 100, this console 4000 itself being fixed, for example by screws 4100, to the revolving frame of the machine. The console 4000 carries the hydraulic or pneumatic directional control valves on it, such as the supply directional control valve of the thrust cylinder 3900, on its rear face.

The rod 4300 of the thrust cylinder 3900 extends roughly parallel to the mold opening/closing axis 700 and to the stretch rod 2700.

A casing 4400 fixes the stretch rod 2700 to a slider or transverse bar 4500 of the thin pole 4600, this transverse bar 4500 itself being connected to the rod 4300 of the thrust cylinder 3900.

The stretch-blow molding station 100 therefore comprises means for the removable connection of the stretch rod 2700 to the means of control of the movements of this rod 2700, said removable connection means comprising the removable casing 4400 in which is fixed one end of the stretch rod 2700, while the other end of the stretch rod 2700 is designed to be inserted into the parison present in the mold during the blowing operation.

The stretch rod 2700 is therefore connected removably and adjustably via the casing 4400 to the transverse bar 4500, to which the upper end of the rod 4300 of the thrust cylinder 3900 is also connected. Consequently, therefore, the stretch rod 2700 is connected removably and adjustably to the rod 4300 of the thrust cylinder 3900 via the transverse bar 4500.

The thin pole 4600, the stretch rod 2700 and the rod 4300 of the thrust cylinder 3900 are advantageously mutually parallel.

Figure 4:
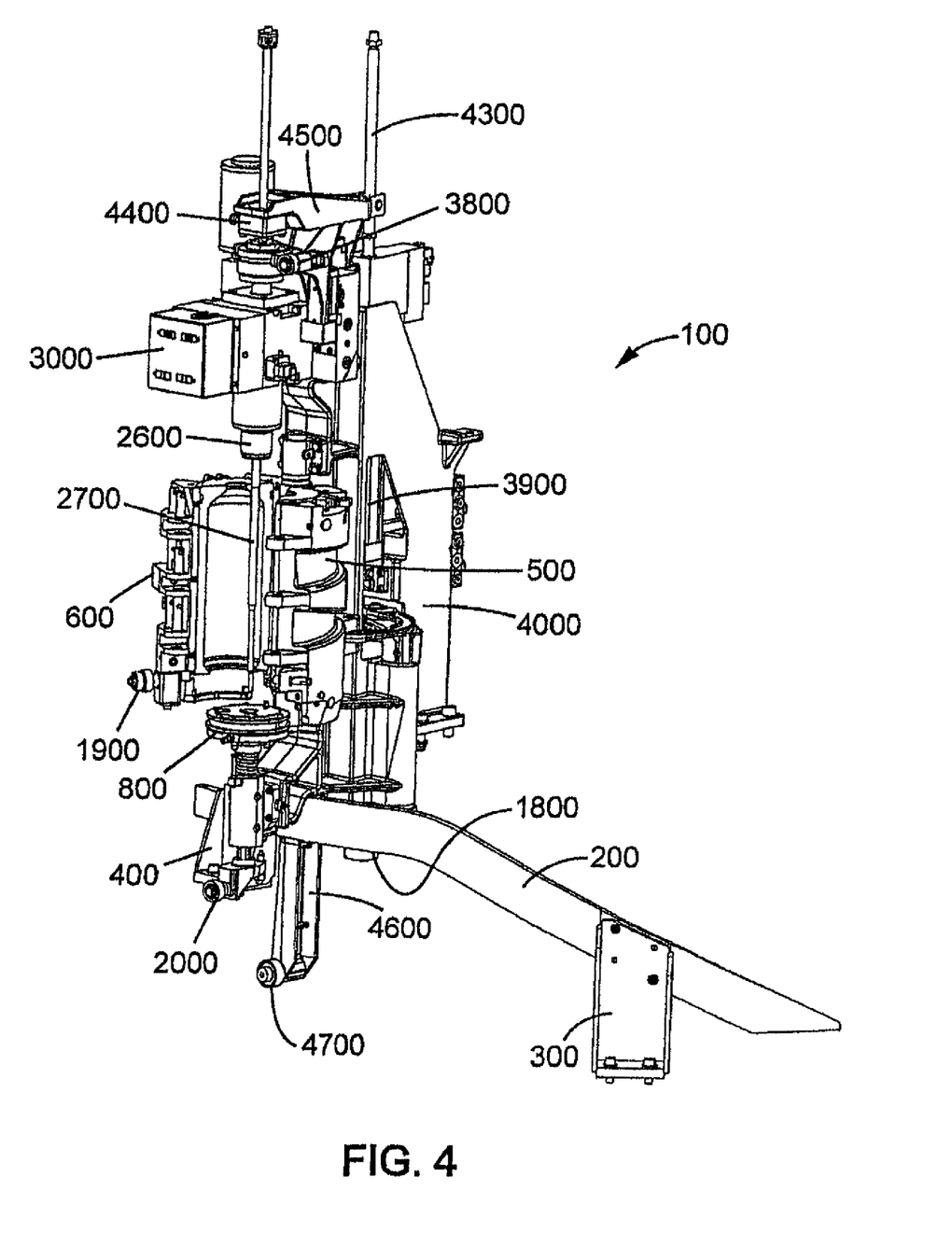

Although in FIGS. 2-4 the stretch rod 2700 and the rod 4300 of the thrust cylinder 3900 are shown passing through and projecting from the transverse bar 4500, it must be understood that they are shown this way purely for reasons of clarity and intelligibility, and it must be realized that, in the preferred embodiment, the upper ends of the stretch rod 2700 and of the rod 4300 of the thrust cylinder 3900 are connected to the transverse bar 4500 and preferably do not project from or pass through it when the stretch-blow molding station 100 according to the invention is in operation.

Figure 5:
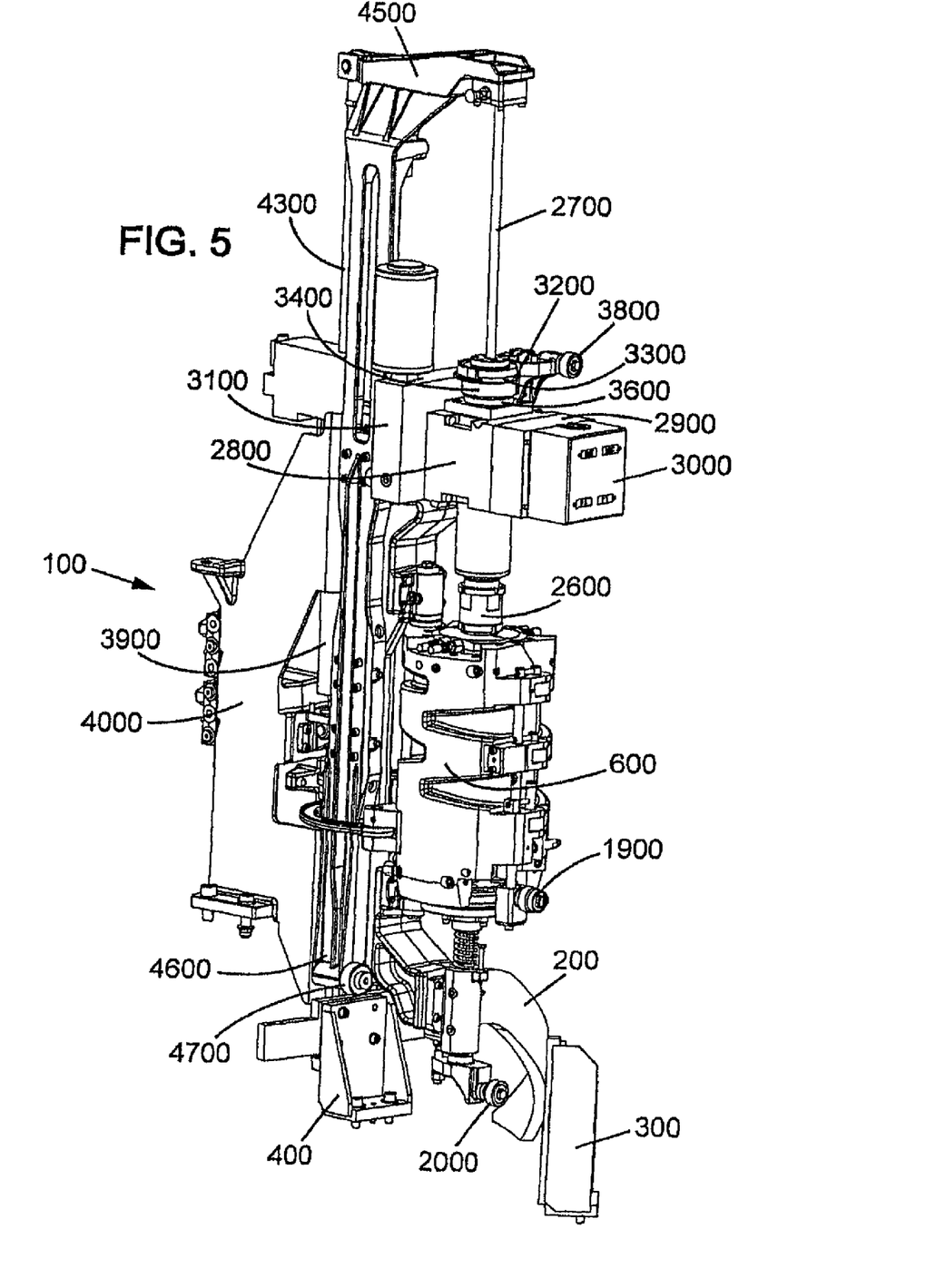
FIG. 5 is a perspective view of a stretch-blow molding station in the preferred embodiment of the invention, with the various component parts of the station connected to each other and the station being in a rest position.
Figure 6:
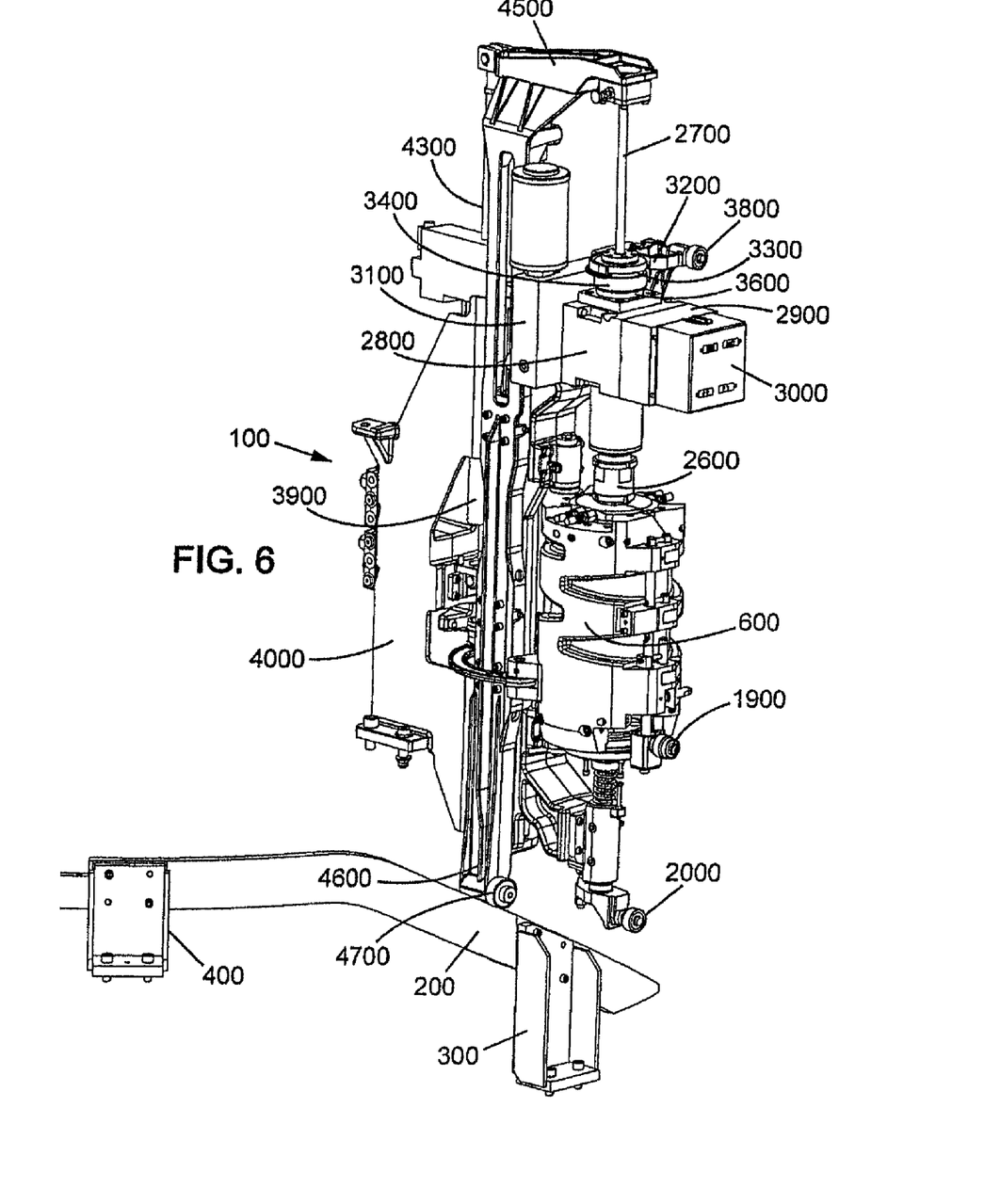
FIG. 6 is a perspective view of a stretch-blow molding station according to the invention, the station being in an intermediate position between the rest position shown in FIG. 5 and the final position where the stretch rod is fully extended into the mold.
Figure 7:
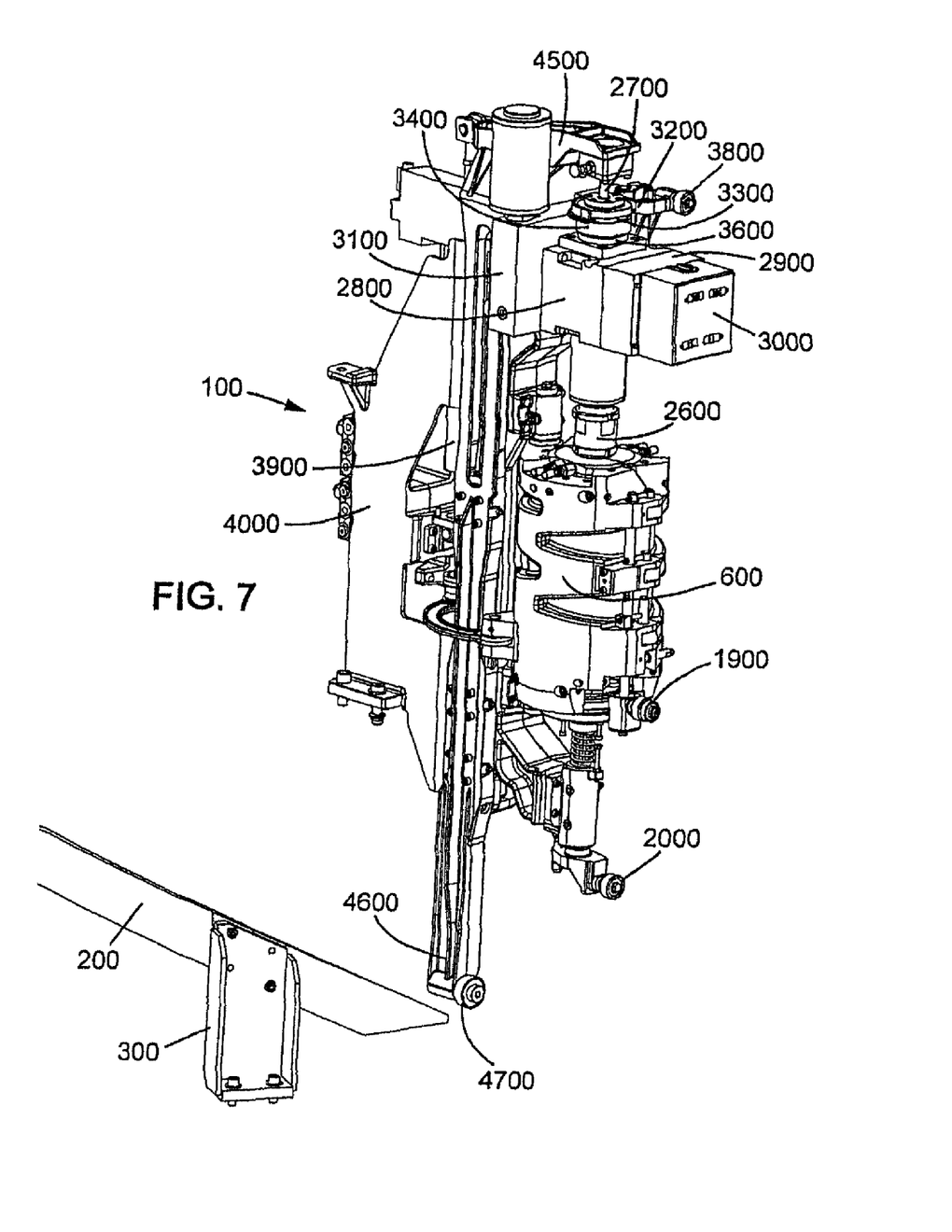
FIG. 7 is a perspective view of a stretch-blow molding station according to the invention, the station being in the final position where the stretch rod is fully extended into the mold.

FIGS. 5-7 show more precisely three successive steps of the stretching by the stretch rod 2700 inside the mold with the various component parts of the station 100 according to the invention in their exact positions at the moment of this stretch-blow molding operation.

The use of such a casing 4400 provides many advantages. A change to the manufacture of the container may necessitate the use of a preform whose length and/or inside diameter may differ from those of the previous run. It may also be necessary to use a stretch rod 2700 whose end which pushes the base of the preform is differently shaped to the preform used in the previous production run. Rotating machines often comprise dozens of molds. The use of a casing 4400 allows a quick change of stretch rods 2700, because in these cases all that has to be done is to replace the casing 4400 in order to modify the characteristics of the stretch rod 2700, such as its length.

The slider or transverse bar 4500 is connected to the thin pole 4600, which in turn slides vertically relative to the console 4000, with the extreme bottom end of this pole 4600 carrying a roller 4700. This roller 4700 presses against the cam 200 when the stretch rod descends into the parison to be blown such as a preform. The cam 200 defines a rolling track for the rollers 4700 of the stations 100, the shape of this track being determined by among other things the nominal speeds of descent of the stretch rod 2700, for example 1700 mm per second.

In other words, the roller 4700 is mounted on the bottom end of the roughly vertically sliding thin pole 4600, this pole 4600 being connected, at its opposite or top end, to the roughly transverse bar 4500 which mechanically connects the stretch rod 2700 to the rod 4300 of the thrust cylinder 3900.

The thrust cylinder actuator 3900 works permanently in tension, the rod 4300 of the thrust cylinder 3900 pointing toward the top of the station 100.

In other words, the thrust cylinder actuator 3900 is controlled in such a way that the thin pole 4600 applies a vertical downward force on the cam 200 as the roller 4700 rolls along the cam 200.

In the position shown in FIG. 2, the stretch rod 2700 is in its lowest position, corresponding to it pressing on the bottom wall of a container, at the end of the blowing operation.

However, it should be pointed out that, for reasons of intelligibility and clarity, FIGS. 2-4 show the blow molding station according to the invention with the mold open, the stretch rod 2700 in the fully extended position, and the roller 4700 on the thin pole 4600 in the bottom position. It must nevertheless be understood that when the rod 2700 is fully extended into the mold in the preferred embodiment of the invention, the mold is closed (so that the interior of the mold cannot be seen) and the roller 4700 on the thin pole 4600 is bearing on the upper edge of the control cam 200 which determines the speed of descent of the stretch rod 2700.

A cam (not shown in the figures but of a type known per se) mounted at the very top of the stretch rod 2700 forms an upper end-of-travel stop for the slider 4500.

FIG. 5 shows a perspective view of a stretch-blow molding station 100 in the preferred embodiment of the invention in a rest position, that is to say a position immediately preceding blowing and stretching of the preform and where the stretch rod 2700 is in its highest position. At this moment the roller 4700 of the thin pole 4600 presses against the upper edge of the cam 200.

The downward movement of the stretch rod 2700 is controlled by the downward rolling movement of the roller 4700 on the cam 200.

Specifically, the roller 4700 presses against the upper edge or profile of the speed control cam 200 as the stretch rod 2700 enters the blowing mold, thus controlling the speed of entry of the stretch rod 2700 into the parison which is present inside the blowing mold.

The thrust cylinder 3900 then works under constant thrust in order to be able to push the roller 4700 of the thin pole 4600 against the top edge of the cam 200. The roller 4700 thus bears against the top edge of the cam 200 during the downward movement of the stretch rod 2700 into the mold.

Advantageously, in order to return the stretch rod 2700 to its initial position before the stretch blow molding operation, the actuator 3900 is able to raise the stretch rod 2700 once the rod 2700 has finished stretching the parison inside the mold and/or once the roller 4700 is no longer pressing against the cam 200 which controls the speed of descent of the rod 2700.

Alternatively, return means may be provided in the form of a spring capable of raising the thin pole 4600 once the roller 4700 is no longer pressing against the cam 200.

As an alternative, it is also possible to have the roller 4700 press against the bottom edge or profile of the cam 200 which controls the speed of descent of the stretch rod 2700.

In this case, the actuator 3900 is able to exert an upward force on the thin pole 4600 to press the roller 4700 against the bottom profile of the cam 200.

FIG. 6 is a perspective view of the blow molding station in an intermediate position, i.e. when the stretch rod 2700 is partly extended and has not reached the base of the mold, as is the case in the perspective view seen in FIG. 7.

To summarize, the invention therefore relates to a station for the stretch-blow molding of preforms with their open end uppermost, comprising a console 4000 supporting a blowing mold; the station 100 also comprising a stretch rod 2700 and control means for controlling the movements of the stretch rod 2700, these control means comprising on the one hand an actuator 3900, and on the other hand a roller 4700 and a speed control cam 200, the roller 4700 pressing against the speed control cam 200 as the stretch rod 2700 enters the blowing mold, thus controlling the speed of entry of this stretch rod 2700 into the blowing mold; the speed control cam 200 being located underneath the base 800 of the blowing mold.

The invention has numerous advantages.

The height of the stretch-blow molding machine can be reduced, compared with machines of the same capacity, by approximately one meter. The cladding structure and the cladding are reduced by the same amount.

The upper frame of the machine is made lighter.

Assembling and disassembling the cam 200 is simplified because it is done on the bottom of the machine.

Lubricating the stretch cam 200 is done at the bottom of the machine, away from the mouths of the containers, and beneath the molds, so there is no risk of the molds being contaminated. This is a very considerable advantage when the blow molding machine is producing drinks bottles.

Unlike conventional assemblies, it has no support for a stretch rod added to the top of a mold-supporting console. The console 4000 supports both a mold-supporting unit and the movement control members of the stretch rod.

The invention has been described in relation to the situation in which the blow molding station has a mold with only one cavity. It can also be used in the case of a two-cavity blow molding station comprising two stretch rods.

The invention claimed is:

1. A station for the stretch-blow molding of preforms with their open end uppermost, comprising a console supporting a blowing mold; the station also comprising a stretch rod and control means for controlling the movements of the stretch rod, these control means comprising on the one hand an actuator, and on the other hand a roller and a speed control cam, said roller pressing against said speed control cam as the stretch rod enters the blowing mold, thus controlling the speed of entry of this stretch rod into the blowing mold; which station wherein the speed control cam is located underneath the base of the blowing mold.

2. The stretch-blow molding station as claimed in claim 1, wherein the actuator is a pneumatic thrust cylinder.

3. The stretch-blow molding station as claimed in claim 1, wherein the actuator is a hydraulic thrust cylinder.

4. The stretch-blow molding station as claimed in claim 1, wherein it comprises means for the removable assembly of the stretch rod to the control means for controlling the movements of this stretch rod.

5. The stretch-blow molding station as claimed in claim 4, wherein said removable assembly means comprise a removable casing in which one end of the stretch rod is fixed, the other end of the stretch rod being intended to be inserted into a parison present inside the mold.

6. The stretch-blow molding station as claimed in claim 2, wherein the roller is mounted at the very bottom of an approximately vertically sliding pole, this pole being connected, at its opposite or top end, to an approximately transverse bar mechanically connecting the stretch rod to the rod of the thrust cylinder.

7. The stretch-blow molding station as claimed in claim 6, wherein the casing is fixed to said transverse bar.

8. The stretch-blow molding station as claimed in claim 6, wherein the upper end of the rod of the thrust cylinder is fixed to the transverse bar.

9. The stretch-blow molding station as claimed in claim 1, wherein the roller presses against the top edge of the cam as the stretch rod descends into the parison present inside the mold.

10. The stretch-blow molding station as claimed in claim 6, wherein the thin pole, the stretch rod and the rod of the thrust cylinder are mutually parallel.

11. The stretch-blow molding station as claimed in claim 6, wherein the actuator is controlled in such a way that the thin pole exerts a vertical downward force on the cam when the roller is rolling along the cam.

12. The stretch-blow molding station as claimed in claim 1, wherein the actuator is able to raise the stretch rod once the rod has finished stretching the parison present inside the mold.

13. The stretch-blow molding station as claimed in claim 1, wherein the actuator is able to raise the stretch rod once the roller is no longer pressing on the cam which controls the speed of descent of the rod.

14. A carousel-type stretch-blow molding machine comprising:
   a revolving frame rotating about an axis of rotation;
   several stretch-blow molding stations supported by the revolving frame;
   a revolving fluid-supply column coaxial with the axis of rotation of the revolving frame; and
   at least one revolving fluid connector located on said column and connected to fixed sources of fluids,
   wherein said machine comprises at least one stretch-blow molding station as claimed in claim 1.

* * * * *